United States Patent
Siu

[11] Patent Number: 6,054,681
[45] Date of Patent: Apr. 25, 2000

[54] COOKING APPARATUS

[76] Inventor: Chong Fu Siu, 2404 Fu Tai House, Tai Wo Hau, Kwai Chung, The Hong Kong Special Administrative Region of the People's Republic of China

[21] Appl. No.: 09/250,598

[22] Filed: Feb. 16, 1999

[51] Int. Cl.[7] ............................. A47J 57/04; F27D 11/02; A21B 1/02; A21B 1/50
[52] U.S. Cl. ........................... 219/385; 219/386; 219/399; 219/403; 219/398; 99/348
[58] Field of Search ....................... 219/385, 386, 219/389, 393, 395, 398, 403, 404, 424; 99/348, 372; 126/19 R; 432/151

[56] References Cited

U.S. PATENT DOCUMENTS

| | | | |
|---|---|---|---|
| 2,041,318 | 5/1936 | Berger | 219/389 |
| 4,048,473 | 9/1977 | Burkhart | 219/389 |
| 4,120,981 | 10/1978 | Burkhart | 99/348 |
| 4,304,177 | 12/1981 | Loeffler et al. | 99/348 |
| 4,450,758 | 5/1984 | Belinkoff et al. | 99/348 |
| 5,182,981 | 2/1993 | Wilcox | 99/348 |
| 5,233,916 | 8/1993 | Butler et al. | 99/348 |
| 5,259,300 | 11/1993 | Yajima | 99/348 |
| 5,638,607 | 6/1997 | Lemme et al. | 219/385 |
| 5,808,276 | 9/1998 | Padilla | 219/386 |

FOREIGN PATENT DOCUMENTS

| | | |
|---|---|---|
| 542006 | 1/1932 | Germany . |
| 2-25629 | 1/1990 | Japan . |
| 5-2673 | 7/1994 | Japan . |

*Primary Examiner*—Joseph Pelham
*Attorney, Agent, or Firm*—Jackson Walker L. P.

[57] ABSTRACT

A domestic electric stand alone cooking apparatus has a lower part and upper part that hingably close together in use to provide a cylindrical cooking chamber. Each part has a separate heating element and that can be separately turned ON and OFF. A stirrer is mechanically coupled to an electric motor (not shown) so that, where required, the foodstuff can be stirrer continuously or intermittently. Different forms of stirrer are normally provided. This leads to a single cooking apparatus that can be used to cook a wide range of foodstuff satisfactorily.

6 Claims, 2 Drawing Sheets

COOKING APPARATUS

BACKGROUND OF THE INVENTION

1. Field of the Invention

The invention relates to cooking apparatus.

2. Description of Prior Art

The invention relates more particularly to a domestic stand alone electric cooking apparatus for use in a home, canteen or restaurant, for example. Such apparatus is already well-known and includes electric hot plates, cook pots, hot oil fryers, grills and so forth. Generally stated, presently known cookers tend to be designed and provided for particular purposes and lack versatility to enable various forms of cooking to take place, and/or provide all round heating where required.

SUMMARY OF THE INVENTION

It is an object of the invention to overcome or at least reduce this problem.

According to the invention there is provided a domestic electric stand alone cooking apparatus comprising a cooking chamber formed by a body consisting of an upper and lower half that close together to form the cooking chamber, an electric heating element for each half, a stirrer releasably mounted inside the cooking chamber, and an electric motor mounted outside the chamber that is mechanically coupled to drive the stirrer in use.

The apparatus may include at least one thermostat electrically connected to a respective one or both heating elements for electrically isolating the elements whenever the temperature in the chamber reaches a predetermined high temperature.

One or more timers may be provided to control automatically the operation of the heating elements and/or electric motor.

The upper and lower halves are preferably each semicylindrical and formed of aluminium, and have inner surfaces that are coated with non-stick material.

The apparatus may include ventilation ports in an upper region of the upper half.

BRIEF DESCRIPTION OF THE DRAWING

A domestic electric stand alone cooking apparatus according to the invention will now be described by way of example with reference to the accompanying drawings in which.

DESCRIPTION OF THE PREFERRED EMBODIMENTS

Figure 1:
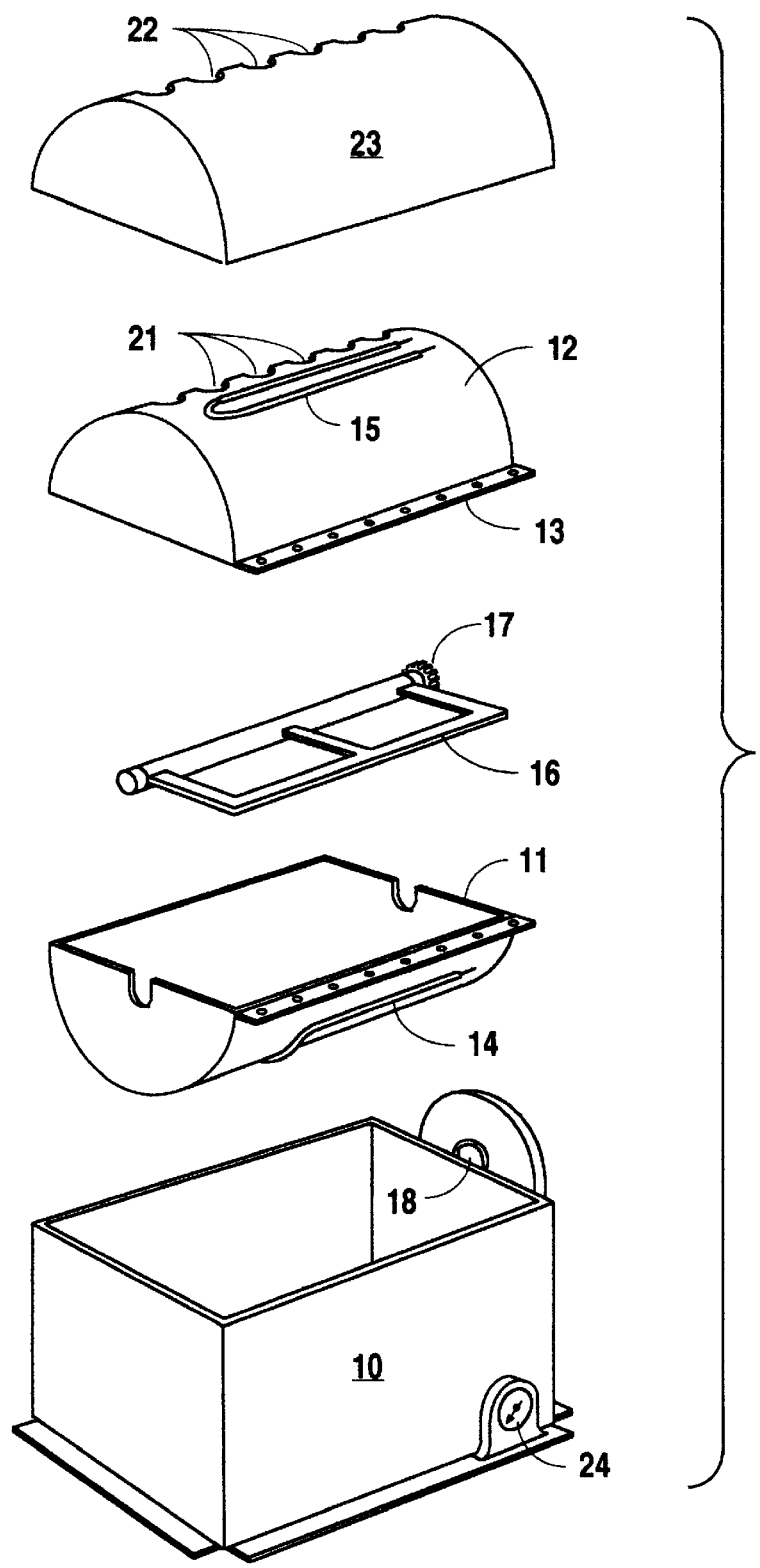
FIG. 1 is an exploded isometric view of the apparatus.

Referring to the drawings, in FIG. 1 the cooker has a base compartment 10 that supports a lower semicylindrical part 11, formed of aluminum, of a cooking chamber. The chamber is formed when an upper aluminium like part 12 is closed against the lower part. The parts 11 and 12 are connected together by an elongate hinge 13 extending externally along one side of the cooking chamber. The lower and upper halves are each provided with an electric heating element 14 and 15, respectively. The elements 14 and 15 are mounted externally against outside surfaces of the parts 11 and 12, but may be embedded in those parts if preferred. A stirrer 16 is rotatably supported at each and mounted inside the cooking chamber. The axis of rotation of the stirrer is arranged to be below a central axis of the cooking chamber to ensure satisfactory operation it cooking takes place with the cooking chamber open, i.e. with the upper part removed or hinged open, such that when the food is pushed up to the horizontal level, the food will still be pushed up and slide back to the cooking chamber but not fall outside. The food will fall outside if the stirrer is situated at the center position, when the cooking chamber is open and the stirrer reaches the horizontal position.

Figure 2:
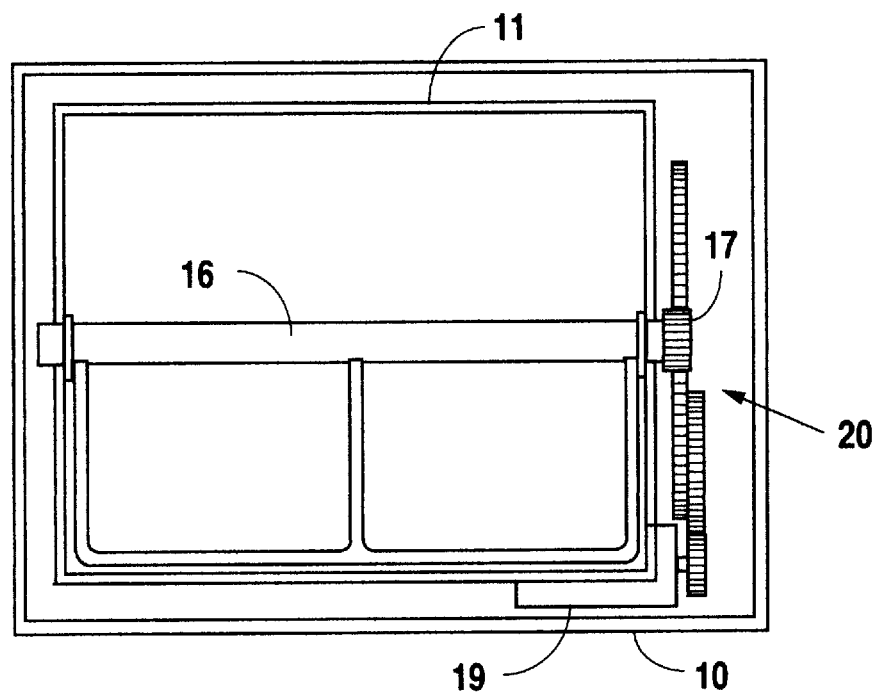
FIG. 2 is a top plan view of a lower part of the apparatus.

A gear wheel 17 is connected to or integrally formed at one end of the stirrer which fits through an aperture 18. An electric motor 19 (see FIG. 2), inside the base compartment 10, is mechanically connected to the gear wheel 17 in use via a reduction gear train 20. A control circuit for the motor is arranged to reverse the motor if resistance to movement (for example when the stirrer is jammed with food) increases above a certain magnitude, such that the stirrer will automatically turn in opposite direction for finishing cooking unattended.

An array of ventilating ports 21 extend along an upper wall of the part 12 which are in communication with apertures 22 in a lid 23 that fits over and surrounds the part 12. Such vents are particularly helpful during a browning function for moisture escape. The apparatus has a manually settable timer 24 for electronic timer operation.

Figure 3:
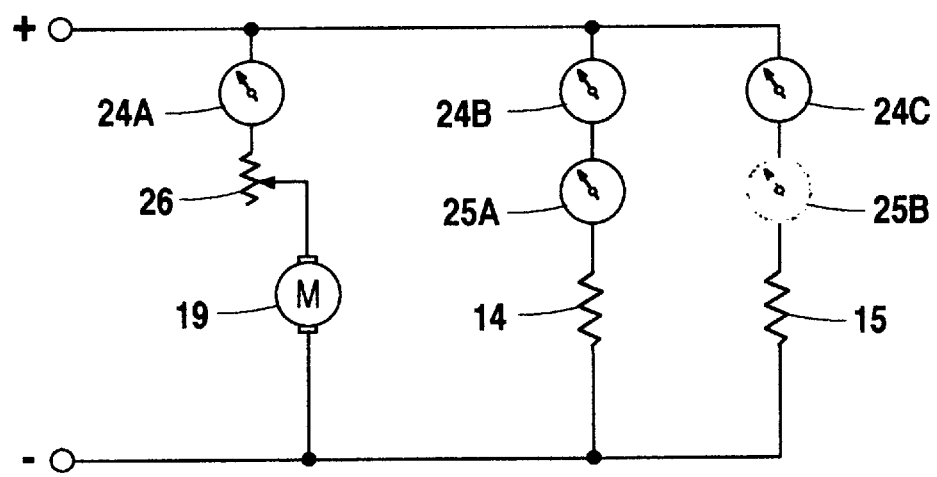
FIG. 3 is an electric circuit for the apparatus.

In FIG. 3, there are three timers 24A, 24B and 24C and two thermostats 25A and 25B. The circuit provides that the motor 19, and hence the stirrer 16, can be operated for a period of time which may be less than an overall cooking time. In some cases, the stirrer 16 may be operated for only part of the overall cooking time, or intermittently throughout or intermittently for only part of the cooking time. In which case, a more complex timer is provided as required. The speed of the motor is also controllable and adjustable by using a manually operable rheostat 26. A variable speed gearbox may alternatively be used for speed control by changing the gear ratio. The timer may be a programmable timer (known per se) so that completely unattended cooking cycles can be carried out.

The form, that is the shape and configuration, of the stirrer can vary. That is to say a number of different stirrers are normally provided for use with the cooking apparatus. The stirrer described is particularly suitable for chipped potatoes and allows the chips to pass through the stirrer as the stirrer rotates, for example. For cooking soup or cake mix an elongate paddle shaped stirrer is more usually preferred. For stir frying, a comb-like stirrer is often desirable.

It will be noted that the circuit in FIG. 3 includes separate timers 24B and 24C for the heating elements 14 and 15. Likewise separate thermostats 25A and 25B are provided. In each case, a single same timer and a single same thermostat may be used. However, it is normally a requirement in any event that the heating elements 14 and 15 are able to be turned ON separately, even if a common timer and thermostat is used. This is because for many cooking operations only the heating element 14 is required, as for deep and stir frying for example. On the other hand, for roasting or braising, it is usual to turn on both heating elements, and for delicate baking to use only the heating element 15.

Importantly, the provision of separate heating elements for both the lower part 11 and the upper part 12, that can be individually controlled as regards operation, temperature and timing, leads to a versatility of the described cooking apparatus not previously available. This, together with the possible continuous, intermittent and mechanically versatile forms of stirrers, enables the described cooking apparatus normally to meet, in one single apparatus, all the preferences and demands of the user for cooking a wide range of foodstuffs.

It has been found that by having virtually total control of the cooking conditions, including automatic stirring where required, more healthy cooking can be achieved. In particular, less oils and fats, or in some cases "dry" cooking performed, to prepare food satisfactorily.

Whereas various components have been described as manually operable, electronic control arrangements may be used additionally or alternatively.

I claim:

1. A domestic electric stand alone cooking apparatus comprising a cooking chamber formed by a body consisting of an upper and lower half that close together to form the cooking chamber, an electric heating element for each half, a stirrer releasably mounted inside the cooking chamber, and an electric motor mounted outside the chamber that is mechanically coupled to drive the stirrer in use.

2. A domestic electric stand alone cooking apparatus according to claim 1, including at least one thermostat electrically connected to a respective one or both heating elements for electrically isolating the elements whenever the temperature in the chamber reaches a predetermined high temperature.

3. A domestic electric stand alone cooking apparatus according to claim 1, including one or more timers to control automatically the operation of the heating elements and/or electric motor.

4. A domestic electric stand alone cooking apparatus according to claim 1, in which the upper and lower halves are each semi-cylindrical and formed of aluminium.

5. A domestic electric stand alone cooking apparatus according to claim 4, in which the inner surfaces of the halves are coated with non-stick material.

6. A domestic electric stand alone cooking apparatus according to claim 1, including ventilation ports in an upper region of the upper half.

* * * * *